US010666430B2

(12) United States Patent
Chhabra et al.

(10) Patent No.: US 10,666,430 B2
(45) Date of Patent: May 26, 2020

(54) SYSTEM AND TECHNIQUES FOR ENCRYPTING CHIP-TO-CHIP COMMUNICATION LINKS

(71) Applicant: Intel Corporation, Santa Clara, CA (US)

(72) Inventors: Siddhartha Chhabra, Portland, OR (US); Prashant Dewan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 15/721,352

(22) Filed: Sep. 29, 2017

(65) Prior Publication Data
US 2019/0103961 A1 Apr. 4, 2019

(51) Int. Cl.
H04L 9/08 (2006.01)
H04L 9/30 (2006.01)
H04L 9/06 (2006.01)

(52) U.S. Cl.
CPC .............. H04L 9/0838 (2013.01); H04L 9/06 (2013.01); H04L 9/0825 (2013.01); H04L 9/0841 (2013.01); H04L 9/30 (2013.01)

(58) Field of Classification Search
CPC ............ H04L 9/0838; H04L 9/06; H04L 9/30
See application file for complete search history.

(56) References Cited

U.S. PATENT DOCUMENTS

| | | | | |
|---|---|---|---|---|
| 2011/0161370 A1* | 6/2011 | Miyamae | ................ | G06F 16/10 707/783 |
| 2011/0161645 A1* | 6/2011 | Zhang | .................... | G06F 21/575 713/2 |
| 2011/0231923 A1* | 9/2011 | Bollay | .................. | H04L 63/166 726/9 |
| 2011/0235806 A1* | 9/2011 | Fukuda | ................. | H04L 9/0825 380/282 |
| 2011/0289004 A1* | 11/2011 | Prakash | .................. | G06Q 20/20 705/71 |
| 2011/0302638 A1* | 12/2011 | Cha | .......................... | G06F 21/57 726/6 |
| 2012/0079287 A1* | 3/2012 | Leclercq | ............... | G06F 21/575 713/192 |
| 2012/0137126 A1* | 5/2012 | Matsuoka | ............. | H04L 9/0838 713/156 |
| 2012/0137137 A1* | 5/2012 | Brickell | .................. | G06F 21/73 713/182 |
| 2012/0257757 A1* | 10/2012 | Gessner | ................ | H04L 9/0838 380/282 |
| 2013/0080764 A1* | 3/2013 | Khosravi | .............. | H04L 9/0822 713/150 |
| 2013/0275769 A1* | 10/2013 | Khosravi | .............. | G06F 21/602 713/189 |
| 2015/0039890 A1* | 2/2015 | Khosravi | .............. | H04L 9/0841 713/171 |

* cited by examiner

Primary Examiner — Yonas A Bayou
(74) Attorney, Agent, or Firm — Nicholson De Vos Webster & Elliott LLP

(57) ABSTRACT

Embodiments detailed herein relate to techniques which enable the creation of secure point-to-point interconnect communication channels between hardware components which may be independently manufactured and arbitrarily paired with one another in a computer system. Also detailed herein is instruction support for dynamically enabling and disabling the security of a point-to-point interconnect link.

23 Claims, 15 Drawing Sheets

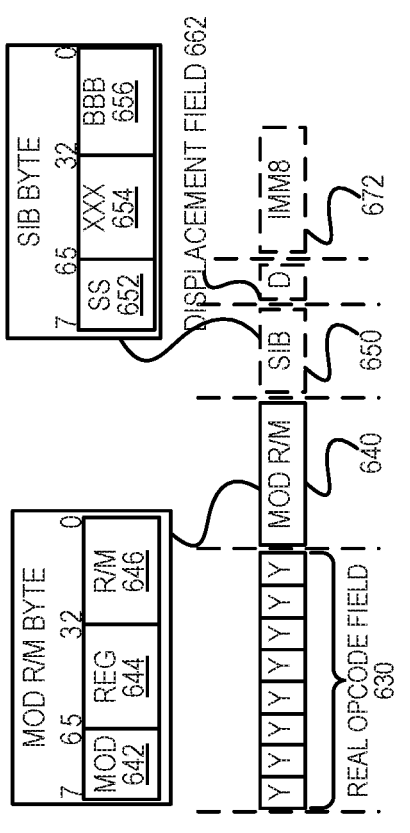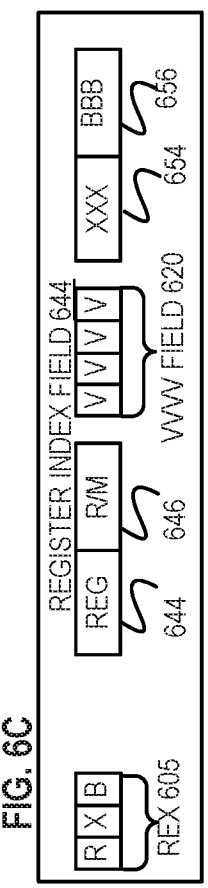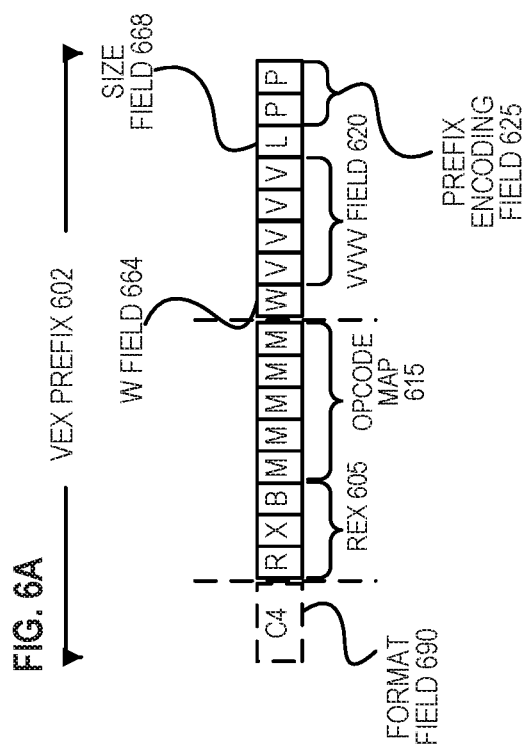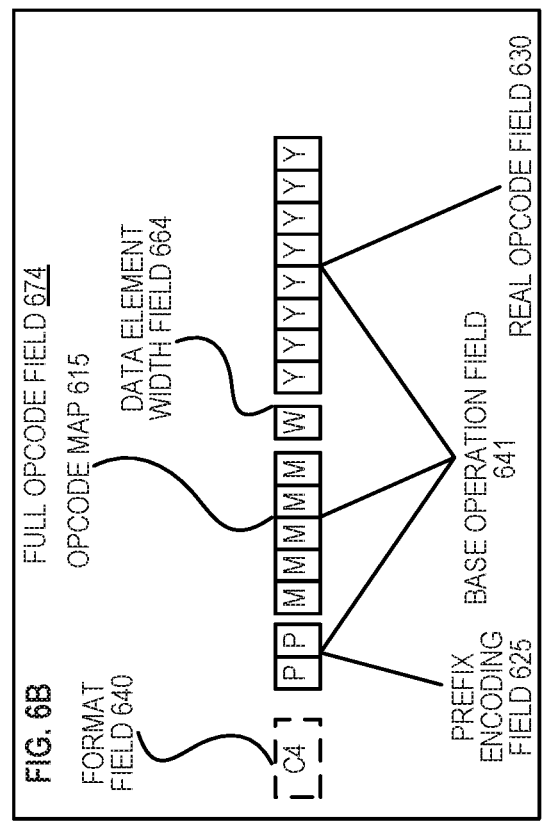

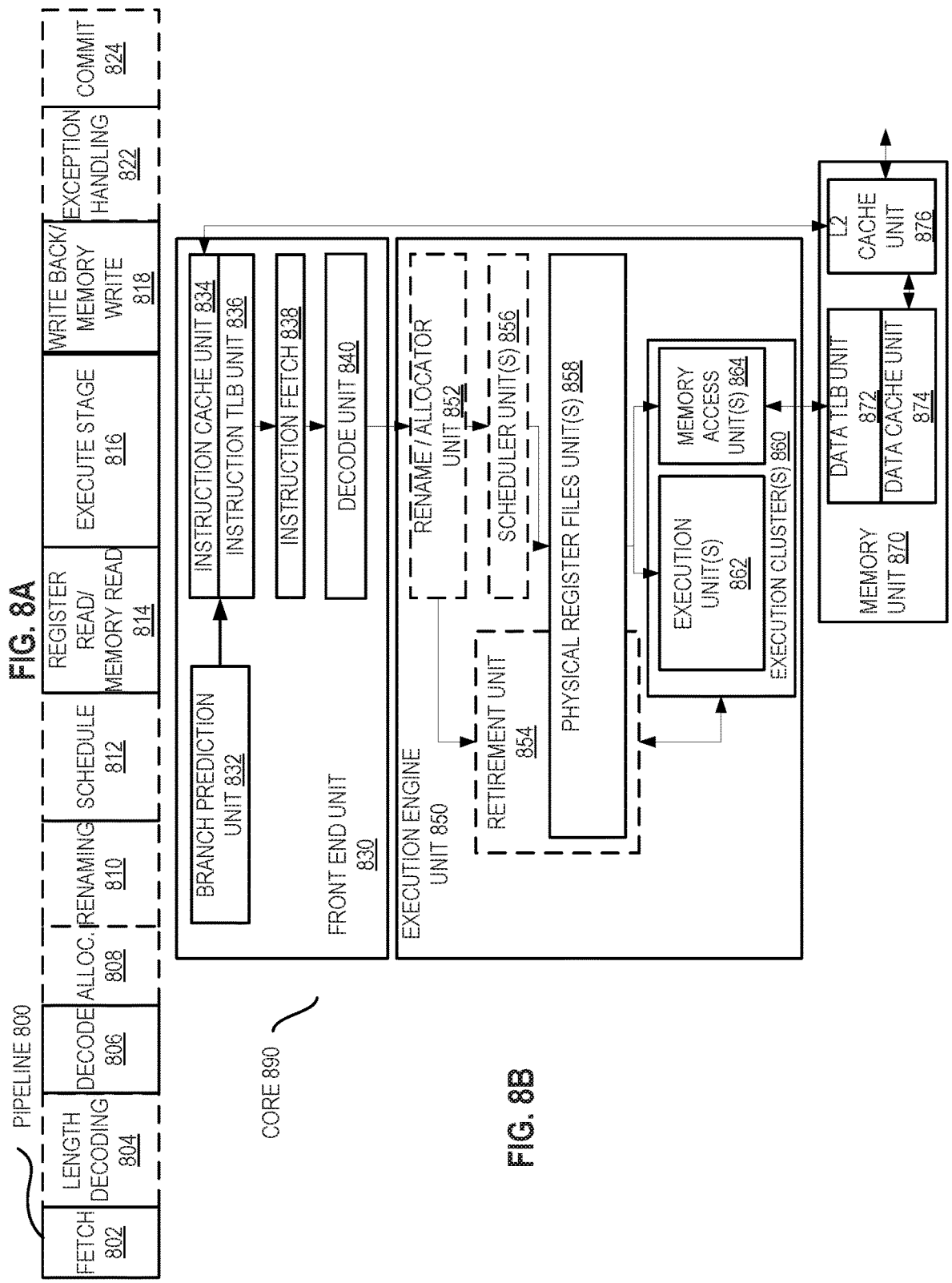

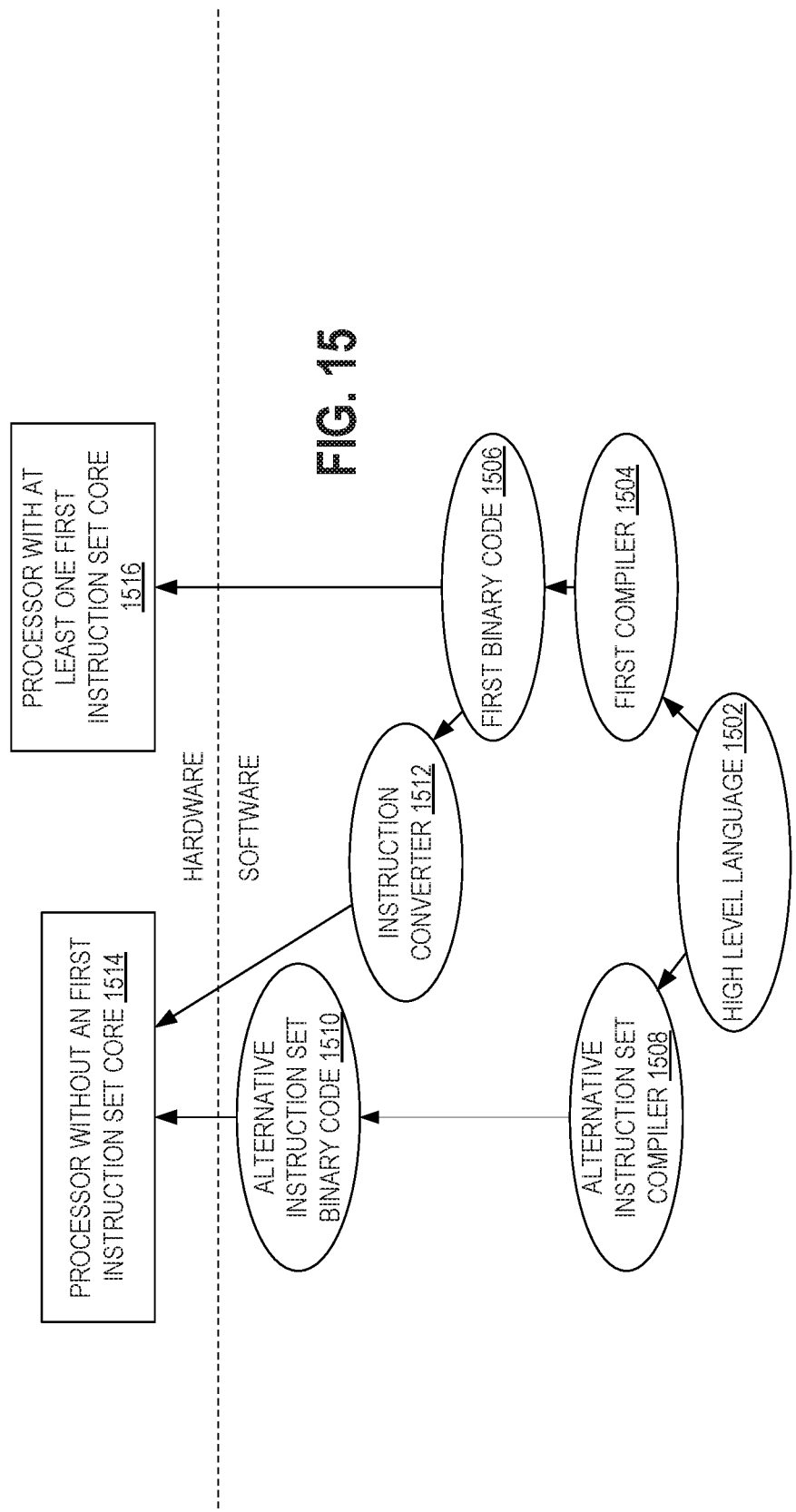

SYSTEM AND TECHNIQUES FOR ENCRYPTING CHIP-TO-CHIP COMMUNICATION LINKS

FIELD OF INVENTION

The field of invention relates generally to computer architecture and, more specifically, to techniques for securing data transmitted between hardware components coupled via a chip-to-chip interconnect.

BACKGROUND

Computer systems once commonly comprised a two-piece chipset architecture consisting of a first chip referred to as a "northbridge" and a second chip referred to as the "southbridge." In these architectures, the northbridge typically interfaces directly with a central processing unit (CPU) via a front-side bus (FSB) and integrates one or more high-speed components such as memory and graphics controllers. In contrast, the southbridge typically is responsible for integrating slower system components including, for example, various types of input/output (I/O) devices.

However, over time, a bottleneck emerged in such architectures due to the limited bandwidth of the FSB connection between the northbridge and CPU and to the increasing performance requirements of high-speed components integrated with the CPU via the FSB. To help alleviate this bottleneck, modern chipset architectures increasingly integrate many of the high-speed functions once associated with a northbridge into the CPU chip itself to achieve lower data transmission latencies among other benefits. Many of the slower components previously supported by a southbridge typically are still supported by a separate I/O chip in these modern architectures.

BRIEF DESCRIPTION OF THE DRAWINGS

The present invention is illustrated by way of example and not limitation in the figures of the accompanying drawings, in which like references indicate similar elements and in which:

FIGS. 6A-6C illustrate an exemplary instruction format;

FIGS. 8A-8B illustrate the in-order pipeline and in-order core;

FIG. 15 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. General Overview

Modern computer systems comprise a complex set of interworking hardware and software components including CPU(s), memory, operating systems, and so forth. The architecture of computer systems has evolved significantly over time in response to increased performance demands and many other factors.

Figure 1B:
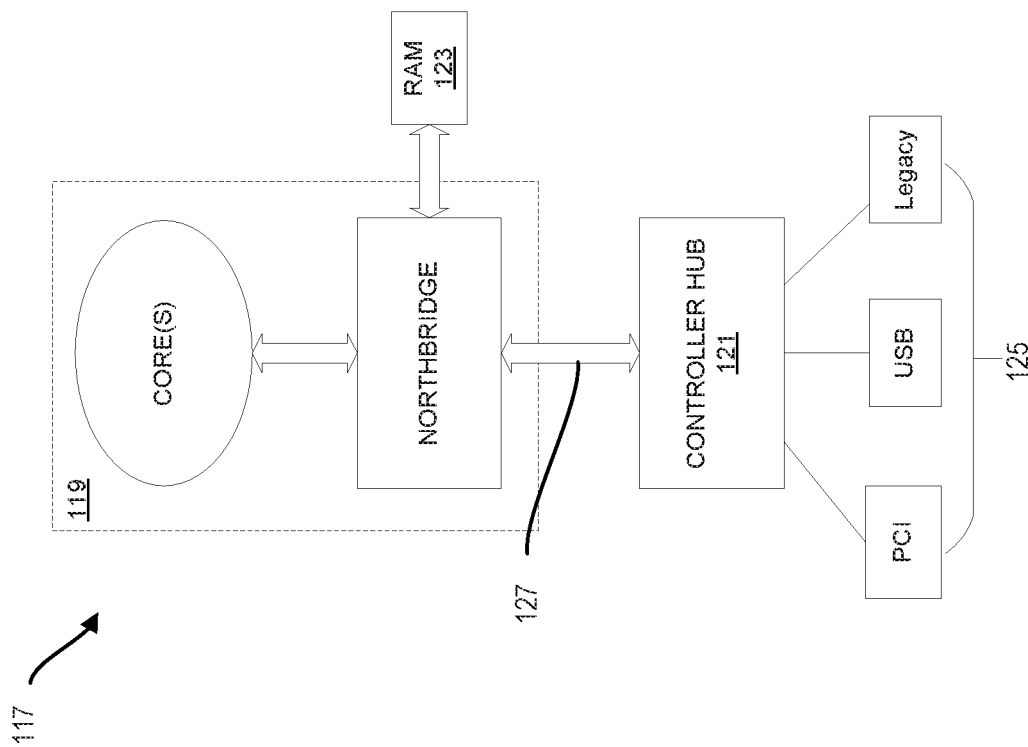
FIGS. 1A and 1B are block diagrams illustrating high-level examples of multi-chip computer architectures, according to some embodiments.
Figure 1A:
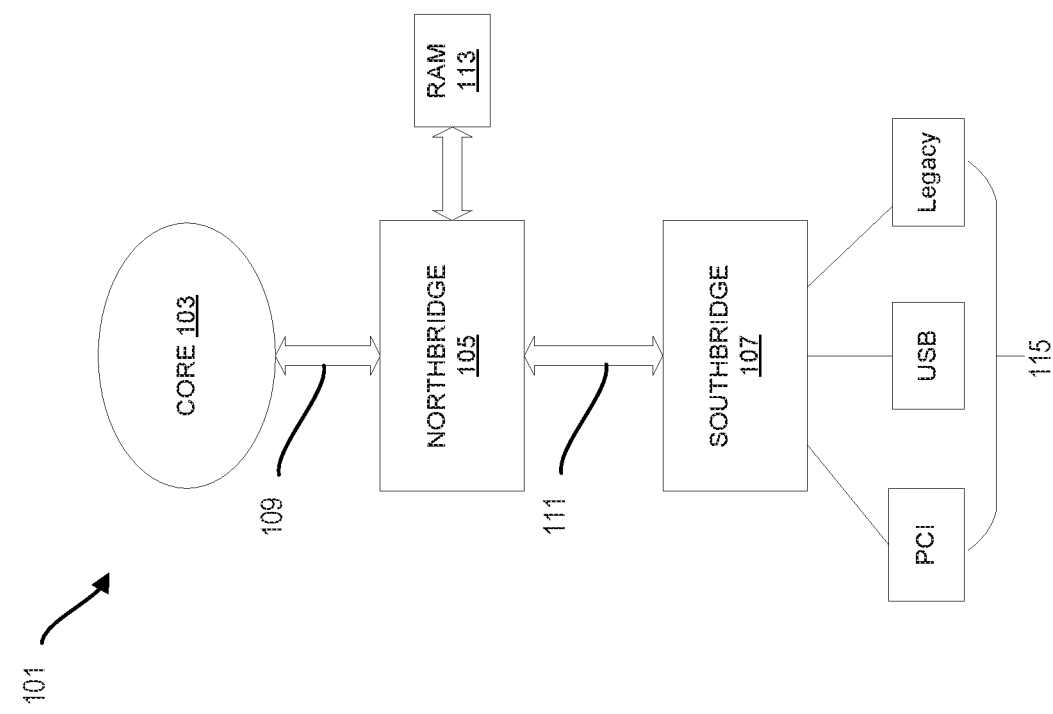

FIGS. 1A and 1B are high-level block diagrams of two different example computer system architectures. FIG. 1A illustrates an example of a once prevalent two-chip architecture 101 including a CPU 103, a northbridge 105, and a southbridge 107, among other possible components. The northbridge 105 interfaces with the CPU 103 via a front-side bus (FSB) 109. The northbridge 105 and southbridge 107 communicate over a separate internal bus 111. The northbridge 105 is shown integrating high-speed memory 113 (and may integrate other high-speed components), while the southbridge 107 is shown integrating several relatively slower I/O devices 115. As described above, demands on the bandwidth of the FSB 109 and increasing performance requirements of high-speed components integrated with a CPU 103 via the FSB 109, among other factors, led to an evolution in computer system architectures.

FIG. 1B illustrates an example of a more modern chipset architecture 117 including an integrated northbridge and CPU 119 and a separate controller hub 121. As shown, the northbridge and CPU 119 (which typically is manufactured on a single CPU chip and can include one or more processing cores and other integrated components) integrates high-speed memory 123, while the separate controller hub 121 integrates several other I/O devices 125. The integrated northbridge and CPU 119 communicates with the controller hub 121 via an internal point-to-point interconnect 127. In some embodiments, this internal point-to-point interconnect 127 is a Direct Media Interface (DMI) link manufactured by Intel® Corporation of Santa Clara, Calif.

Many different types of I/O devices 125 can be connected to a device controller of a controller hub 121. Some types of components, including secure sensor devices, biometric recognition devices, and others, operate by establishing a cryptographically secure communication channel between the device and the CPU 119 to protect sensitive data transmitted to and from the device. For example, to avoid security vulnerabilities, a fingerprint scanner might rely on transmitting fingerprint data collected by the scanner to a CPU 119 using a secure communication channel established with the CPU.

The creation of a secure communication channel between an I/O device 125 and the CPU 119 typically involves the exchange of a shared cryptographic key between the CPU and the secure device. The shared cryptographic key, for example, allows the device 125 and CPU 119 to encrypt and decrypt communications exchanged between the components. In existing systems, the initial exchange of a cryptographic key used to secure such a communication channel typically travels from the CPU 119 to the device over a point-to-point interconnect 127. However, the transmission of data over an interconnect 127 is not inherently secure—that is, the data travels over the interconnect unencrypted by default and is therefore susceptible to being maliciously intercepted. Thus, the initial transfer of cryptographic keys or other secure data over this unsecured communication channel represents a potential security vulnerability.

Securing the transmission of data over a point-to-point link, such as an interconnect 127, from potential security vulnerabilities presents several challenges. For example, the computer system components connected via a point-to-point interconnect, such as a CPU 119 and a controller hub 121 in FIG. 1B, typically are manufactured independently of one another and possibly by different manufacturing entities. Furthermore, the pairing of a CPU component with a separately manufactured controller hub in a computer system typically is arbitrary and is not known at the time the components are manufactured. These and other factors cause many static, manufacturing time security solutions (for example, hard-coding a shared key on each of the separate hardware components) to be infeasible.

According to embodiments described herein, techniques are provided which enable the creation of secure point-to-point interconnect communication channels between hardware components which may be independently manufactured and arbitrarily paired with one another in computer systems. Although many of the described embodiments refer to securing a point-to-point link between a CPU and a separate I/O controller hub, for example, similar techniques can be used to secure chip-to-chip communications between any two separate hardware components (for example, between a CPU and a third-party graphics chip or other any other hardware components connected via a point-to-point interconnect).

Embodiments described herein also provide a computer-executable instruction that allows the security of a point-to-point link to be dynamically enabled and disabled. For example, the instruction enables software and firmware of a computer system to enable the security features when transmitting secure data over the link and to disable the security during other periods when transmitting data over the link for which security may be unnecessary. Disabling the link security during periods when security may be unnecessary can help minimize performance overheads associated with securing the link (for example, power and performance overheads associated with encrypting and decrypting data sent over the link).

II. Exemplary Hardware Support

According to embodiments described herein, the creation of secure point-to-point interconnect communication channels involves using a public key exchange protocol to establish secure channels between hardware components communicating via the interconnect. A secure channel established using a public key exchange protocol can be used by hardware components and other devices communicating via the associated point-to-point interconnect to send and receive data securely. In one example, a secure sensor or other device can use an established secure channel to receive a shared cryptographic key from a CPU and can use the key to establish a separate end-to-end secure communication channel between the secure sensor and the CPU. The ability to receive the shared cryptographic key over the established secure channel prevents malicious interception of the key before the device and CPU can establish the separate end-to-end secure communication channel.

As indicated above, the creation of a secure point-to-point interconnect communication channel may involve use of a public key exchange protocol. A public-key exchange protocol enables two parties to securely establish a shared cryptographic key over a public channel and without either party having specific knowledge of the other party. For example, the Diffie-Hellman protocol or other key exchange algorithm can be used to securely exchange cryptographic keys over a public channel. As used in embodiments described herein, a public key exchange protocol enables separate hardware components, which may be independently manufactured and arbitrarily paired with one another in a computer system, to establish a shared secret key for use in securing data transmitted between the hardware components.

Figure 2:
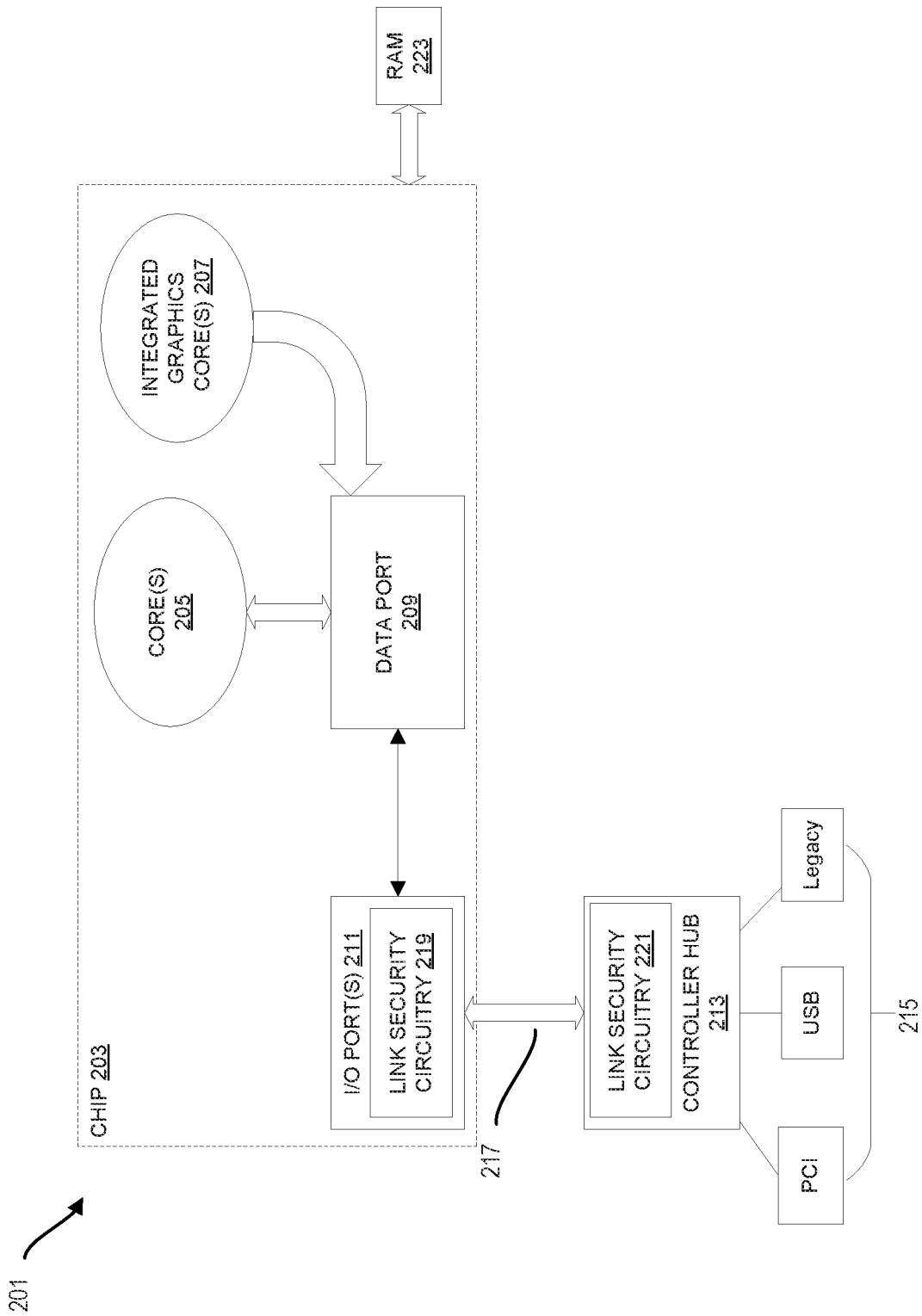
FIG. 2 is a block diagram of a multi-chip computer architecture including circuitry used to secure chip-to-chip communication links, according to some embodiments.

FIG. 2 illustrates exemplary hardware components and circuitry used to create secure chip-to-chip communication channels, according to embodiments. The computer system 201 comprises a first chip 203, which includes processor core(s) 205, integrated graphics cores 207, data port 209, and I/O port(s) 211. The first chip 203 further interfaces with memory 223 and possibly other high-speed components (not shown). For example, a first chip 203 might represent a chip such as an integrated CPU and northbridge 119, as shown in FIG. 1, and may include more or fewer integrated components in various embodiments.

The computer system 201 also includes a second chip 213. In the example of FIG. 2, the second chip 213 is shown as a controller hub used to integrate various I/O devices 215. The I/O devices 215 may include, for example, one or more secure devices. As indicated above, while the example of FIG. 2 depicts the second chip 213 as a controller hub, in general, the first chip 203 and second chip 213 can be any hardware components coupled via one or more point-to-point interconnects. The first chip 203 and the second chip 213 interface with one another via a point-to-point interconnect 217.

In an embodiment, the computer system 201 includes elements used to create secure communication channels over a point-to-point interconnect 217. For example, in FIG. 2, the I/O ports 211 of the first chip 203 include link security circuitry 219 and the second chip 213 includes link security circuitry 221. In this example, the first chip and second chip can establish a secure communication channel over the point-to-point interconnect 217 using a public key exchange protocol implemented by the respective link security circuitry 219 and 221. In other examples, the link security circuitry 219 and 221 can be part of other hardware or firmware components. Additional details related to the operation of the link security circuitry 219 and 221 is provided herein with reference to FIG. 3.

In some embodiments, the entities involved in a public key exchange protocol might be provisioned initially with data to facilitate implementation of the protocol. For example, both parties involved in a public key protocol exchange might be provisioned with a public key certificate of the other party to avoid man-in-the middle attacks where messages sent during a public key exchange are intercepted by a malicious third party. Referring to FIG. 2, for example, each of the first chip 203 and second chip 213 can be initially provisioned with one or more public key certificates used to verify the identity of other hardware components with which a public key exchange might be performed.

According to various embodiments, each of the link security circuitry 219 and 221 components can be implemented in one of several ways. In one embodiment, one or both link security circuitry components can be implemented in hardware. For example, hardware-based implementations of public-key exchange protocols generally can be implemented using a relatively small number of gates (approximately 30,000 gates in some implementations), which represents a small size increase for a typical chip. In other embodiments, public-key exchange circuitry 219 and 220 can be implemented in firmware including a microcontroller to run the firmware. In general, a hardware or firmware implementation may be selected based on various factors including desired processing speed, cost, and size.

Figure 3:
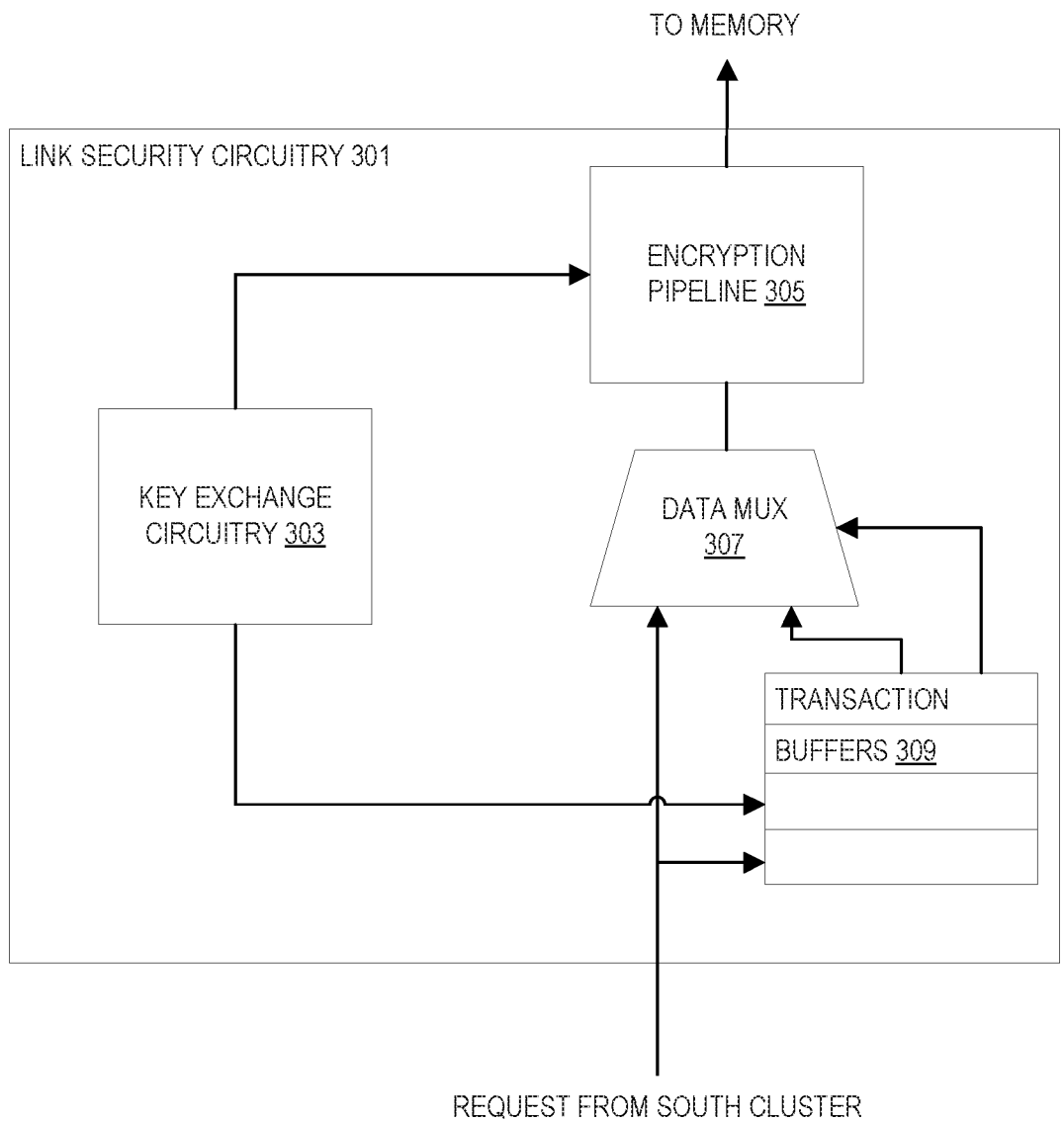
FIG. 3 is a block diagram of circuitry used to secure chip-to-chip communication links, according to some embodiments.

FIG. 3 shows elements of exemplary link security circuitry, according to some embodiments. The example link security circuitry 301 includes key exchange circuitry 303, an encryption pipeline 305, a data mux 307, and transaction buffers 309. As indicated above, the elements of link security circuitry 301 can be implemented in hardware, firmware, or a combination of both.

In an embodiment, key exchange circuitry 303 performs public key exchanges with other computer system components and provides cryptographic keys generated based on a public key exchange to the encryption pipeline 305. For example, in response to receiving a request to establish a secure communication channel, the key exchange circuitry 303 of a first chip can communicate via a point-to-point interconnect with similar key exchange circuitry of a second chip to establish a shared secret key. The key exchange circuitry 303 can provide the shared secret key to an encryption pipeline 305 for use in encrypting and decrypting subsequent communications transmitted via the associated point-to-point interconnect.

In an embodiment, an encryption pipeline 305 encrypts write data requests going towards memory and, while not shown in FIG. 3, can also decrypt read requests received over the interconnect link before sending to the requested data to the request originator. As described above, an encryption pipeline 305 can use a cryptographic key obtained from key exchange circuitry 303 to encrypt data received from a data mux 307 (or to decrypt data received via an associated interconnect). In one embodiment, the encryption pipeline 305 encrypts and decrypts data using the Advanced Encryption Standard (AES) encryption algorithm. In general, any encryption algorithm can be used by encryption pipeline 305 to encrypt and decrypt data depending on security requirements and other factors.

In an embodiment, transaction buffers 306 can be used to store data transmission requests received by the link security circuitry 301 subsequent to receiving a request to establish a secure interconnect communication link but before the secure communication link is established. For example, in response to a software process sending a request to enable security of an interconnect link, the process might assume that subsequent requests to send data over the link are secured. However, execution of a public key exchange protocol typically takes several instruction cycles to complete. Hence, the key exchange circuitry 303 may buffer transactions in transaction buffers 309 from the point in time that link security is requested until the time that the key exchange protocol is completed and data can be encrypted and decrypted using the established key. In this example, if the key exchange implementation takes n instruction cycles to complete, transaction buffers 309 can be configured to store up to n subsequent transaction requests (assuming one transaction can be received per instruction cycle). A data mux 307, for example, can be used to manage sending requests stored in transaction buffers 309 once the key exchange protocol is completed.

As described above, link security circuitry, such as link security circuitry 219 and 221, can be used to establish a secure communication channel between hardware components (for example, between a first chip 203 and second chip 213) coupled to one another via a point-to-point interconnect 217. In an embodiment, an established secure communication channel can be used by a processing core 205 or other component to send cryptographic keys or other secure data to other component and devices using the secured communication channel. For example, an encryption pipeline 305 on one side of the communication channel can use a shared key established by a public key exchange to encrypt a cryptographic key sent from the processing core to a device via the point-to-point interconnect, thereby protecting the cryptographic key when it is sent over the interconnect. This cryptographic key can be decrypted on the other side of the communication channel for use by a device, such a secure sensor, to establish a separate secure communication channel between the processing core and the device.

III. Exemplary Instructions

In an embodiment, the security of a point-to-point interconnect link can be dynamically enabled and disabled by one or more software and firmware processes running on a computer system. The security of a link can be enabled by such processes using a new link security instruction, also referred to herein as a SETSEC instruction. As one example, this new instruction can be used by a system BIOS to expose a user-selectable option to enable or disable link security, or by one or more software processes to dynamically enable and disable link security as desired by the software.

Figure 4:
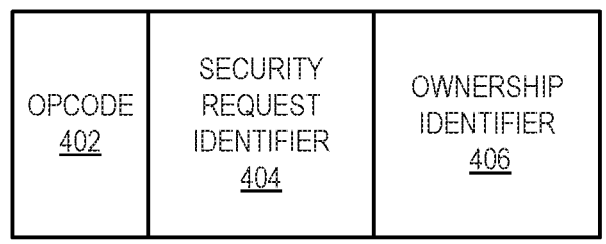
FIG. 4 is a block diagram illustrating an example format of an instruction used to enable or disable a secure chip-to-chip communication link, according to some embodiments.

FIG. 4 is a block diagram illustrating a format of a generic link security instruction, according to some embodiments. As shown, instruction 400 includes opcode 402, security request identifier 404, and an ownership identifier 406. In an embodiment, security request identifier 404 identifies whether the requesting process desires either to enable security of a link or to disable existing security of a link. An ownership identifier 406 is a value identifying a software or firmware process from which the requests originates. An example format for a link security instruction 400 is SETSEC EAX=ON/OFF, RBX:RCX=OWNERSHIP_INFO, where a first register ("EAX") is set with the security request identifier and one or more other registers ("RBX:RCX") are set with an ownership identifier.

Figure 5:
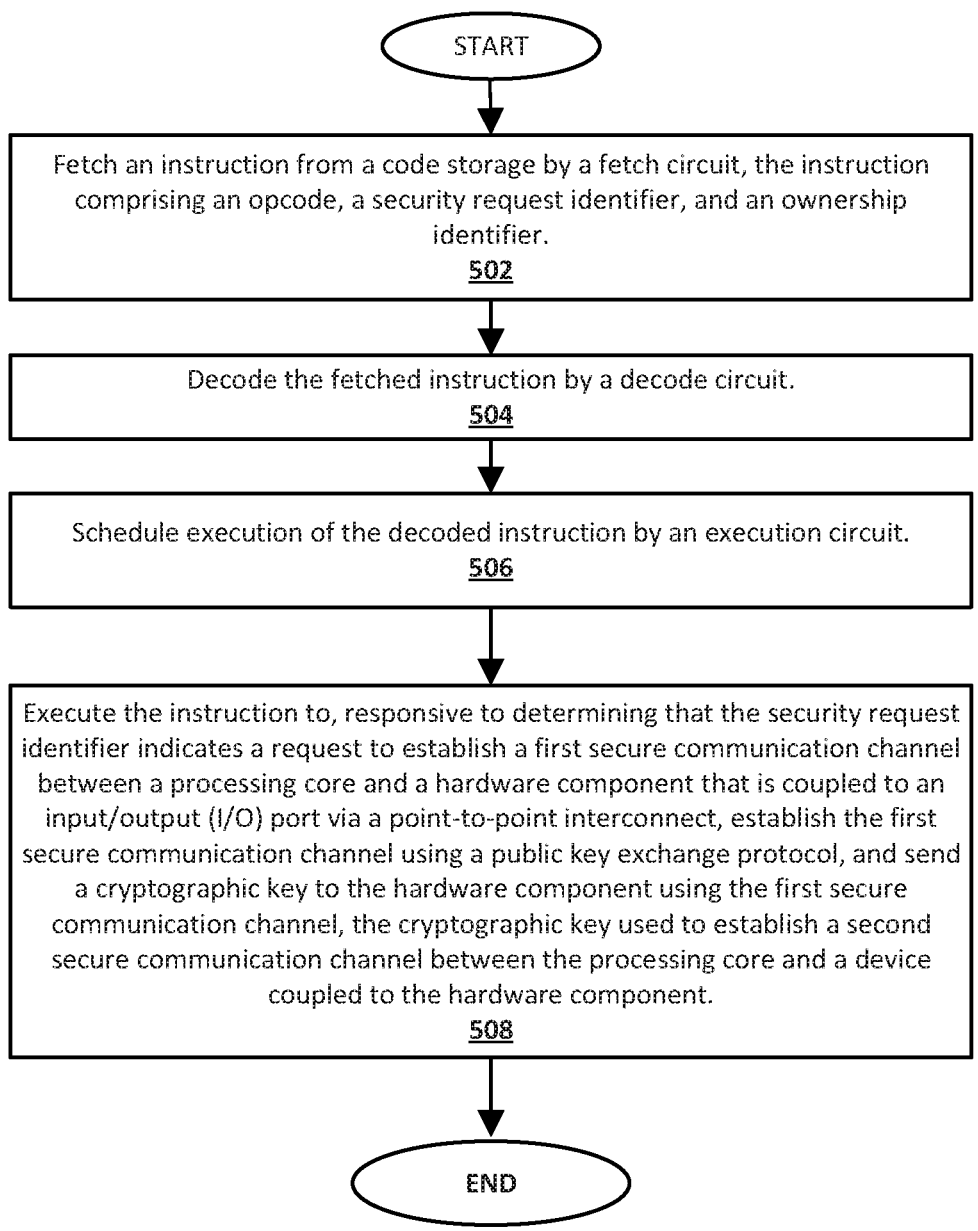
FIG. 5 is a flow diagram of a process to be performed by a processor to execute an instruction to enable or disable a secure chip-to-chip communication link, according to some embodiments.

FIG. 5 is a flow diagram of a process to be performed by a processor to execute a link security instruction, according to some embodiments. For example, the link security instruction may be executed in response to firmware or a software process (for example, a hypervisor, virtual machine, or application running on the computer system) requesting that the security of a particular link be enabled or disabled. The requesting process can then use the secured link, for example, to transmit and receive secure data, such as one or more cryptographic keys used to establish a separate secure end-to-end channel between two components communicating via the link.

After starting, the process at 502 fetches the instruction from a code storage by a fetch circuit, the instruction comprising an opcode, a first operand identifier, and a second operand identifier, where the first identified operand is to store a security request identifier and the second identified operand is to store an ownership identifier. At 504, a decode circuit decodes the fetched instruction. At 506, execution of the decoded instruction by an execution circuit is scheduled.

At 508, the execution circuit, responsive to determining that the security request indicates a request to establish a secure communication channel between a processing core and a hardware component that is coupled to an input/output (I/O) port via a point-to-point interconnect, causes first link security circuitry of the processing core and second link security circuitry of the hardware component to establish the secure communication channel using a public key exchange protocol. For example, referring to FIG. 2, execution of a link security instruction may cause first link security 219 and second link security circuitry 221 to establish a secure communication channel over the interconnect 217 using a public key exchange protocol.

In an embodiment, the ownership identifier included with the link security instruction can be used to ensure that a process requesting the security of a link is the only process that can later disable the protection. For example, this check can be used to avoid security attacks wherein a separate process disables the security of the link without the knowledge of the process that originally requested and established the secure link. In an embodiment, execution of a link security instruction requesting to establish a secure link includes storing the ownership identifier specified by the instruction. Subsequent execution of a link security instruction requesting to disable the link security includes comparing an ownership identifier specified by the subsequent instruction with the original value stored during execution of the instruction establishing the secure link. Protection of a secure link may be disabled only if the identifier of the process requesting to disable the secure link matches the identifier of the process originally requesting to enable the link security. In this example, the instruction fails on a mismatch with the reason for failure indicated to the requesting process with an error code (for example, error codes such as SETSEC_SUCCESS and SETSEC_FAILURE may be defined).

Another possible security vulnerability arises if a malicious process is able to prevent execution of a link security instruction from instructing one or both of the involved hardware components to enable the secure link. In one embodiment, to prevent such attacks, execution of a link security instruction includes monitoring completion of the public key exchange protocol between the involved hardware components using a status register which is set to indicate a completion status of the key exchange protocol. Execution of the link security instruction can include polling this status register and complete when either the public key exchange completes or the public key exchange logic indicates failure (for example, based on a timeout due to one or both of the hardware components not responding). This ensures that requesting software is aware of the protection status after execution of the link security instruction and security attacks on an associated interconnect link cannot break the security provided by the link security instruction.

IV. Extensions and Alternatives

A. Reducing Hardware Size and Instruction Latency

Referring again to FIG. 3, depending on the implementation of the link security circuitry 301, the latency associated with executing a public key exchange can cause the transaction buffers 309 to be large, thereby resulting in increased area cost. In one embodiment, to minimize or eliminate an area cost incurred by the transaction buffers 309, the link security circuitry 301 exposes a read-only status register which can be used to indicate a current link security status (for example, "enabled" or "disabled"). In this example, the status information stored in the register is accessible to processes using a new instruction, GETDMISEC, where execution of the instruction reads the status register and returns the current link security status to the requesting process.

In an embodiment, using the example GETDMISEC instruction, a process attempting to enable link protection can execute the following sequence to ensure that data requests are transmitted with a desired link security level. First, the process can cause execution of a SETSEC instruction to request enabling security of the link (for example, "SETSEC EAX=ON, RBX:RCX=OWNERSHIP_INFO"). Next, the SETSEC instruction returns before the public key encryption protocol is complete. If the requesting process receives a SUCCESS status in response to executing the instruction, the link is not currently owned by a different process and is available for protection by the requesting process.

Next, the requesting process can execute a GETDMISEC instruction in a loop until the status returned by the instruction indicates that protection is successfully enabled. In some examples, the process may include a policy instructing the process to timeout after a fixed interval of time if an "enabled" status is not returned. In response to receiving the "enabled" status using the GETDMISEC instruction, the process can assume that subsequent requests for transmitting data over the link are secured. In addition to reducing the latency of executing the SETSEC instruction, this embodiment can be implemented without using transaction buffers 309 because requesting processes do not assume that the link is protected as soon as a link security instruction is executed. Instead, processes causing execution of a link security instruction wait for the result of the GETDMISEC instruction to indicate the link is protected before sending secure data.

B. Managing Link Contention Scenarios

According to embodiments described herein, an example instruction used to request security of an interconnect link includes an identifier of the process requesting ownership of the secured link. As described above, execution of the instruction including the ownership identifier ensures that only one process owns the security of a link at any one time to avoid security issues associated with conflicting link security requests. However, this implementation may cause situations where multiple processes desire to own the security of a link at the same time and are unable to do so concurrently.

In one embodiment, if a secured interconnect link is currently owned by a process, any other process attempting to secure the same link receives an error code indicating to the process that the request was unsuccessful. In response to receiving the error code, the later requesting process can decide whether to continue using the link owned by the first process, knowing that the security of the link can be disabled without its knowledge at any point by the current owner, or the later requesting process can wait for the first process to release ownership of the link and establish ownership itself.

The following describes an example security link contention scenario in greater detail. In this example, two different processes, P1 and P2, each desire to ensure protection of a same interconnect link at different but overlapping times. First, process P1 causes execution of a link security instruction (for example, "SETSEC EAX=ON, RBX: RCX=OWNERSHIP_INFO_P1") and successfully obtains ownership of the link. A processor executing the instruction maintains the ownership identifier "OWNERSHIP_INFO_P1" internally to identify the process P1 as the current owner of the link.

While the process P1 is still owner of the link, a different process P2 may cause execution of the link security instruction requesting security and ownership of the same link (for example, "SETSEC EAX=ON, RBX: RCX=OWNERSHIP_INFO_P2"). As indicated above, execution of the link security instruction includes checking whether there is an existing owner of the link. In this example, the current ownership identifier ("OWNERSHIP_INFO_P1") is determined not to match the requesting process ownership information ("OWNERSHIP_INFO_P2") and an error code is generated (for example, "SETSEC_FAILURE"). For example, a separate register can be updated to store the error code for access by the process P2. In other examples, the error code can be more detailed to provide additional information to the requesting process about the reasons the link security request was unsuccessful. In response to the process P2 receiving the failure notification, the process P2 can decide whether to use the link without the guarantee of protection (because the process P1 can disable the security at any time) or wait for the process P1 to release ownership of the link.

In some embodiments, interconnect links can be viewed as system-wide resources where security of the links is managed by system software. In a virtualized environment, for example, a virtual machine manager can be responsible for managing link security. In this example, once a virtual machine manager enables security of one or more interconnect links, any virtual machines running on top of the manager can share the protection. Additionally, since a link security instruction may be a ring-0 instruction, execution controls for this instruction can be provided to allow the virtual machine manager to control the execution of this instruction on the guest.

C. Extending to Trusted Execution Environments

In some embodiments, support is provided for securing interconnect communication channels in a trusted execution environment (TEE), where a TEE may not trust system software like operating systems and virtual machines.

Typical computing devices may rely on software agents, such as anti-malware agents, for security. However, it is difficult to keep up with the increasing number of malware attacks on users' devices. To combat the malware threat, there is a trend to protect security sensitive software by running it inside a TEE. TEEs provide a sterile environment that can protect secrets even when other parts of the system are compromised. Examples of TEEs include Intel® Software Guard Extensions (Intel® SGX), secure virtual machines (VMs), and a converged security engine (CSE). The TEE, while useful to protect secrets within the TEE, may not protect I/O data such as user and sensor data that is communicated into and/or out of the secure "container." The security requirements for trusted I/O vary per use case and device, and involve flavors and combinations of confidentiality, integrity, liveliness, and replay protection.

On a personal computer platform, securing I/O has several complexities. To protect I/O for a given usage, many input devices may need to be secured because the platform often has multiple devices of the same category connected via different I/O controllers, and a user may dynamically select any one of the connected devices during use. For example, when inputting text, the user may choose to use an embedded keyboard, a USB keyboard, or a Bluetooth (BT) keyboard. The user may also use a touch screen to input data. This means all keyboards and touch input may need to be secured for a usage that requires secure text input. Additionally, I/O devices may be used by secure applications and by regular applications, which means that those devices may be required to switch dynamically from being protected to being in the clear and vice versa.

Examples included below involve securing interconnect communication channels using techniques for secure programming of a cryptographic engine. As used herein, these instructions allow a processor to establish a TEE, also known as a secure enclave, in which executing code may be measured, verified, and otherwise determined to be authentic. Additionally, code and data included in the secure enclave may be encrypted or otherwise protected from being accessed by code executing outside of the secure enclave. For example, code and data included in the secure enclave may be protected by hardware protection mechanisms while being executed or while being stored in certain protected cache memory of the processor. The secure enclave support may be embodied as a set of processor instruction extensions that allows the processor to establish one or more secure enclaves in the memory.

The cryptographic engine programming support allows a processor to program the cryptographic engine to provide cryptographic protection of I/O data. In particular, a processor may enable or disable encryption for certain I/O channels, and may securely provide encryption keys to the cryptographic engine. The crypto engine programming support may be embodied as one or more specialized processor instructions (for example, the instructions EBINDTIO, UNWRAP, or other instructions) and associated hardware, microcode, firmware, or other components of the processor. At a high level, an EBINDTIO instruction allows a secure enclave to wrap information for particular a target device on the platform, and an UNWRAP instruction allows unwrapping of wrapped programming information stored in an EBIND blob.

In an embodiment, a new target is introduced for secure programming to a point-to-point interconnect block. In this embodiment, an enclave can populate a BIND_STRUCT structure for an EBINDTIO instruction as defined in the table below:

| Field | Offset (Bytes) | Size (Bytes) | Description |
| --- | --- | --- | --- |
| VERSION | 0 | 4 | BIND_STRUCT version, is 1 for first instantiation |
| RSVD | 4 | 12 | Reserved, is zero |
| MAC | 16 | 16 | MAC on BTENCDATA, BTDATA, BTID, BTSVN, NONCE, SEQID |
| BTID | 32 | 4 | Target device, Set to an interconnect |
| BTSVN | 36 | 4 | Target Security version number |
| NONCE | 40 | 8 | Nonce for Authenticated Response |
| SEQID | 48 | 8 | Seed for generating Initialization vector (IV) |
| RSVD | 56 | 8 | Reserved, is zero |
| BTDATA | 64 | 128 | Target specific data |
| BTENCDATA | 192 | 48 | Target specific encrypted data, is a multiple of 16 |
| BTUPDATA | 240 | 16 | Target specific data that is not encrypted nor integrity protected |

As shown in the table above, a BTDATA field is set up by the enclave to include information for the target device. In case of a point-to-point interconnect block, the BTDATA field can include a command (e.g., SET_PROT_ON, SET_PROT_OFF, CHECK_PROT_STATUS) and point-to-point secure link ownership information. In this example, a SET_PROT_ON command is used to enable link protection, SET_PROT_OFF is used to disable link protection, and CHECK_PROT_STATUS is similar to the previously described GETDMISEC instruction and returns the current protection status. The BIND_STRUCT populated by the enclave is wrapped (that is, encrypted and integrity protected) using a key known only to the CPU using EBIND. The wrapped blob can then be sent to untrusted software for programming. The untrusted software (for example, a device driver) executes a ring-0 instruction, UNWRAP, passing the wrapped EBIND blob. Execution of the UNWRAP instruction verifies the integrity of the EBIND blob to ensure that the untrusted software did not modify it during transition. Once the integrity of the EBIND blob is verified, the unwrapped blob is programmed to the target device. In the case of a point-to-point interconnect, based on the command received (for example, SET_PROT_ON, SET_PROT_OFF, or CHECK_PROT_STATUS), the actions described earlier for execution of a SETSEC instruction can be taken. As an example, if an enclave intends to enable protection using a SET_PROT_ON command, functionality equivalent to execution of a SETSEC instructions (for example, SETSEC EAX=ON, RBX:RCX=OWNERSHIP_INFO) can be implemented in UNWRAP using the ownership information provided by the enclave using EBIND.

Additionally, because enclaves may not trust the operating system or virtual machine manager to execute an UNWRAP instruction, UNWRAP provides for a cryptographic response which can be generated only if the untrusted software executed UNWRAP. This response is verified by the requesting enclave to verify that the untrusted software executed the requested actions through UNWRAP, providing protection against malicious software.

V. Exemplary Embodiments

1. An apparatus, comprising: a processing core; an input/output (I/O) port, coupled to the processing core, having circuitry to: establish a first secure communication channel between the processing core and a hardware component that is coupled to the I/O port via a point-to-point interconnect, wherein the first secure communication channel is established using a public key exchange protocol, and send a cryptographic key to the hardware component using the first secure communication channel, the cryptographic key used to establish a second secure communication channel between the processing core and a device coupled to the hardware component.

2. The apparatus of example 1, wherein the hardware component is an I/O controller hub supporting one or more I/O devices.

3. The apparatus of example 1, wherein the hardware component is an I/O controller hub and the device coupled to the hardware component is a secure sensor.

4. The apparatus of example 1, wherein the hardware component is a graphics chip.

5. The apparatus of example 1, wherein sending the cryptographic key to the hardware component using the first secure communication channel includes encrypting the cryptographic key using a public key of a public-private key pair created by the public key exchange protocol.

6. The apparatus of example 1, wherein the I/O port further has circuitry to decrypt data received from the hardware component using a private key of a public-private key pair created using the public key exchange protocol.

7. The apparatus of example 1, wherein the I/O port further has circuitry to store, in a buffer, data related to at least one operation to be performed subsequent to establishing the first secure communication channel.

8. The apparatus of example 1, wherein the public key exchange protocol is based on a Diffie-Hellman key exchange protocol.

9. The apparatus of example 1, wherein the first secure communication channel between the processing core and the hardware component is established responsive to execution of an instruction requesting establishment of the secure communication channel.

10. The apparatus of example 1, wherein the I/O port further has circuitry to disable the secure communication channel responsive to execution of an instruction requesting disabling of the secure communication channel.

11. The apparatus of example 1, wherein the first secure communication channel between the processing core and the hardware component is established responsive to execution of an instruction requesting establishment of the secure communication channel, and wherein ownership of the first secure communication channel is associated with a process identified by the instruction.

12. A processor comprising: decode circuitry to decode an instruction having an opcode, a first operand identifier, and a second operand identifier, wherein the identified first operand is to store a security request and the identified second operand is to store an ownership identifier; and execution circuitry to execute the decoded instruction to, responsive to determining that the security request indicates a request to establish a secure communication channel between a processing core and a hardware component that is coupled to an input/output (I/O) port via a point-to-point interconnect, causes first link security circuitry of the processing core and second link security circuitry of the hardware component to establish the secure communication channel using a public key exchange protocol.

13. The processor of example 12, wherein the identified first operand and identified second operand are registers.

14. The processor of example 12, wherein the hardware component is an I/O controller hub supporting one or more I/O devices.

15. The processor of example 12, wherein the hardware component is an I/O controller hub supporting one or more I/O devices including a secure sensor.

16. The processor of example 12, wherein the hardware component is a graphics chip.

17. The processor of example 12, wherein execution of the decoded instruction further stores, in a buffer, data related to at least one operation to be performed subsequent to establishing the secure communication channel.

18. The processor of example 12, wherein the public key exchange protocol is based on a Diffie-Hellman key exchange protocol.

19. The processor of example 12, wherein execution of the decoded instruction further stores the ownership identifier.

20. The processor of example 12, wherein execution of the decoded instruction further maintains a status register indicating a status of the establishment of the secure communication channel.

21. The processor of example 12, wherein execution of the decoded instruction further determines whether security of the point-to-point interconnect currently is owned by a process associated with a different ownership identifier from the ownership identifier.

22. A method comprising: decoding an instruction having an opcode, a first operand identifier, and a second operand identifier, wherein the identified first operand is to store a security request and the identified second operand is to store an ownership identifier; and
executing the decoded instruction to, responsive to determining that the security request indicates a request to establish a secure communication channel between a processing core and a hardware component that is coupled to an input/output (I/O) port via a point-to-point interconnect, causes first link security circuitry of the processing core and second link security circuitry of the hardware component to establish the secure communication channel using a public key exchange protocol.

23. The method of example 22, wherein the identified first operand and identified second operand are registers.

24. The method of example 22, wherein the hardware component is an I/O controller hub supporting one or more I/O devices.

25. The method of example 22, wherein the hardware component is an I/O controller hub and the device coupled to the hardware component is a secure sensor.

26. The method of example 22, wherein the hardware component is a graphics chip.

27. The method of example 22, wherein execution of the decoded instruction further includes storing, in a buffer, data related to at least one operation to be performed subsequent to establishing the secure communication channel.

28. The method of example 22, wherein the public key exchange protocol is based on a Diffie-Hellman key exchange protocol.

29. The method of example 22, wherein execution of the decoded instruction further includes storing the ownership identifier.

30. The method of example 22, wherein execution of the decoded instruction further includes maintaining a status register indicating a status of the establishment of the secure communication channel.

31. The method of example 22, wherein execution of the decoded instruction further includes determining whether security of the point-to-point interconnect currently is owned by a process associated with a different ownership identifier from the ownership identifier.

32. A non-transitory machine-readable medium storing an instruction which when executed by a processor causes the processor to perform a method, the method comprising:
decoding an instruction having an opcode, a first operand identifier, and a second operand identifier, wherein the identified first operand is to store a security request and the identified second operand is to store an ownership identifier; and
executing the decoded instruction to, responsive to determining that the security request indicates a request to establish a secure communication channel between a processing core and a hardware component that is coupled to an input/output (I/O) port via a point-to-point interconnect, causes first link security circuitry of the processing core and second link security circuitry of the hardware component to establish the secure communication channel using a public key exchange protocol.

VI. Detailed Exemplary Systems, Processors, and Emulation

Detailed herein are examples of hardware, software, etc. to execute the above described instructions. For example, what is described below details aspects of instruction execution including various pipeline stages such as fetch, decode, schedule, execute, retire, etc.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down through the definition of instruction templates (or subformats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2). An occurrence of this ADD instruction in an instruction stream will have specific contents in the operand fields that select specific operands.

A. Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 6A illustrates an exemplary AVX instruction format including a VEX prefix 602, real opcode field 630, Mod R/M byte 640, SIB byte 650, displacement field 662, and IMM8 672. FIG. 6B illustrates which fields from FIG. 6A make up a full opcode field 674 and a base operation field 641. FIG. 6C illustrates which fields from FIG. 6A make up a register index field 644.

VEX Prefix (Bytes 0-2) 602 is encoded in a three-byte form. The first byte is the Format Field 690 (VEX Byte 0, bits [7:0]), which contains an explicit C4 byte value (the unique value used for distinguishing the C4 instruction format). The second and third bytes (VEX Bytes 1 and 2) include several bit fields providing specific capability. Specifically, REX field 605 (VEX Byte 1, bits [7:5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 615 (VEX byte 1, bits [4:0]—mmmmm) includes content to encode an implied leading opcode byte. W Field 664 (VEX byte 2, bit [7]—W)—is represented by the notation VEX.W and provides different functions depending on the instruction. The role of VEX.vvvv 620 (VEX Byte 2, bits [6:3]—vvvv) may include the following: 1) VEX.vvvv encodes the first source register operand, specified in inverted (1s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 668 Size field (VEX byte 2, bit [2]—L)=0, it indicates 128-bit vector; if VEX.L=1, it indicates 256-bit vector. Prefix encoding field 625 (VEX byte 2, bits [1:0]—pp) provides additional bits for the base operation field 641.

Real Opcode Field 630 (Byte 3) is also known as the opcode byte. Part of the opcode is specified in this field.

MOD R/M Field 640 (Byte 4) includes MOD field 642 (bits [7:6]), Reg field 644 (bits [5:3]), and R/M field 646 (bits [2:0]). The role of Reg field 644 may include the following: encoding either the destination register operand or a source register operand (the rrr of Rrrr), or be treated as an opcode extension and not used to encode any instruction operand. The role of R/M field 646 may include the following: encoding the instruction operand that references a memory address, or encoding either the destination register operand or a source register operand.

Scale, Index, Base (SIB)—The content of Scale field 650 (Byte 5) includes SS 652 (bits [7:6]), which is used for memory address generation. The contents of SIB.xxx 654 (bits [5:3]) and SIB.bbb 656 (bits [2:0]) have been previously referred to with regard to the register indexes Xxxx and Bbbb.

The Displacement Field 662 and the immediate field (IMM8) 672 contain data.

B. Exemplary Register Architecture

Figure 7:
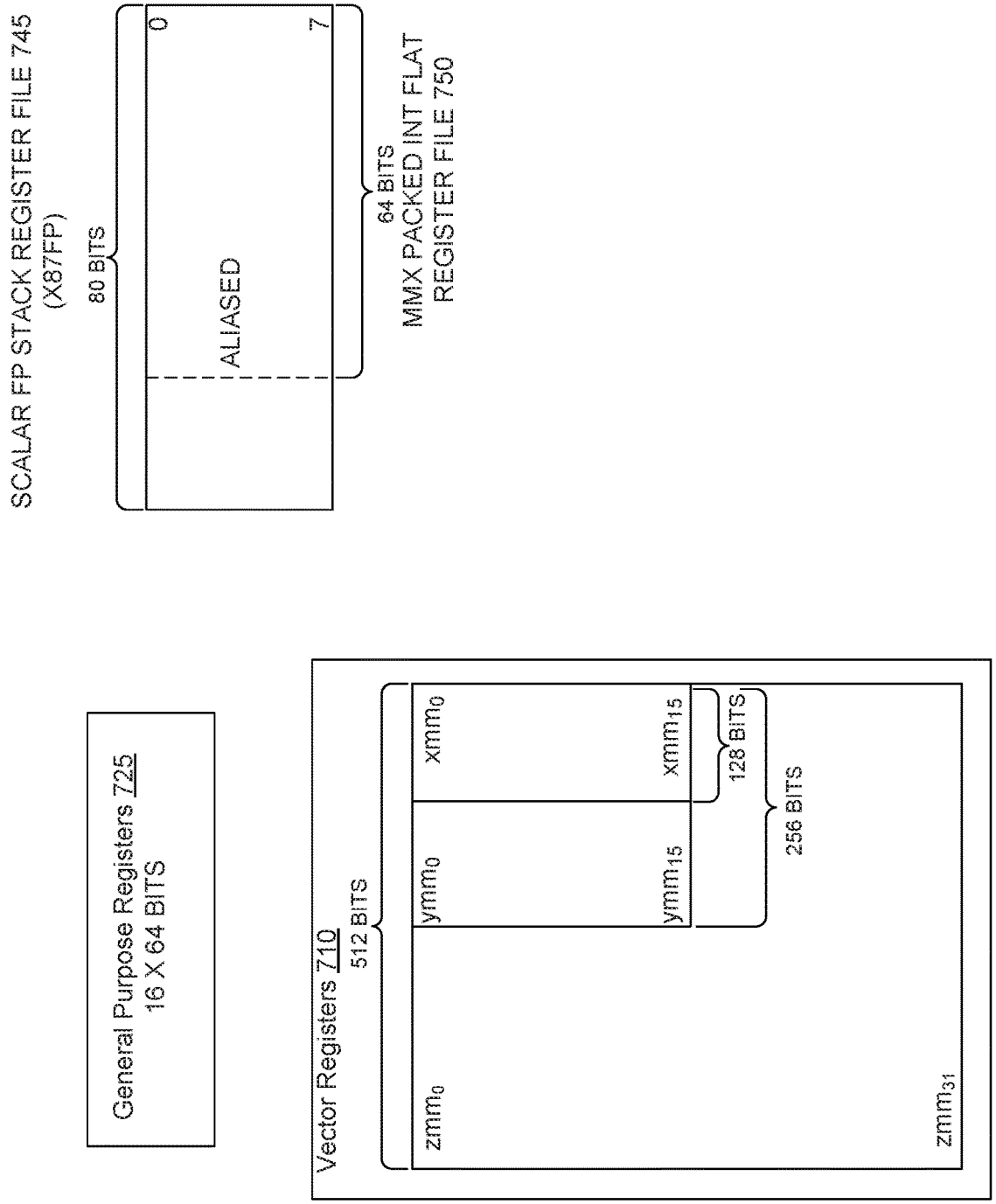
FIG. 7 is a block diagram of a register architecture according to one embodiment of the invention.

FIG. 7 is a block diagram of a register architecture 700 according to one embodiment of the invention. In the embodiment illustrated, there are 32 vector registers 710 that are each 512 bits wide; these registers are referenced as zmm0 through zmm31. The lower order 256 bits of the lower 710 zmm registers are overlaid on registers ymm0-15. The lower order 128 bits of the lower 710 zmm registers (the lower order 128 bits of the ymm registers) are overlaid on registers xmm0-15.

General-purpose registers 725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 745, on which is aliased the MMX packed integer flat register file 750—in the embodiment illustrated, the x87 stack is an eight-element stack used to perform scalar floating-point operations on 32/64/80-bit floating point data using the x87 instruction set extension. The MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

C. Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

D. Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front-end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front-end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output of one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front-end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit and a scalar registers unit. These register units may provide architectural vector registers, vector mask registers, and general-purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 9B:
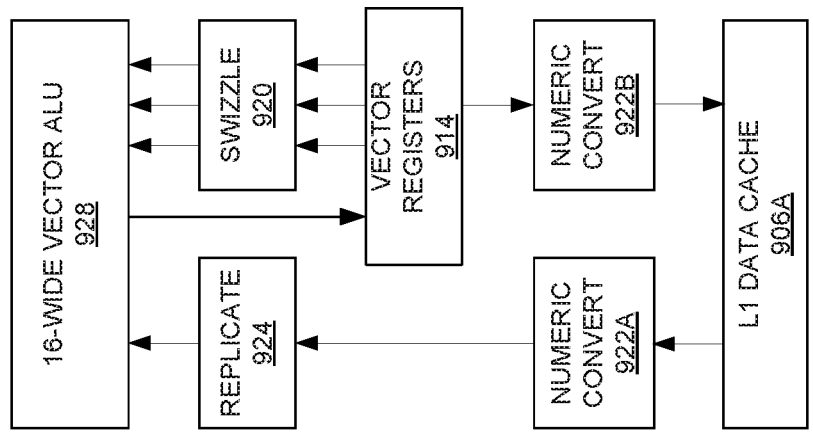
FIGS. 9A-9B illustrate a block diagram of a more specific exemplary in-order core architecture, which core would be one of several logic blocks (including other cores of the same type and/or different types) in a chip.
Figure 9A:
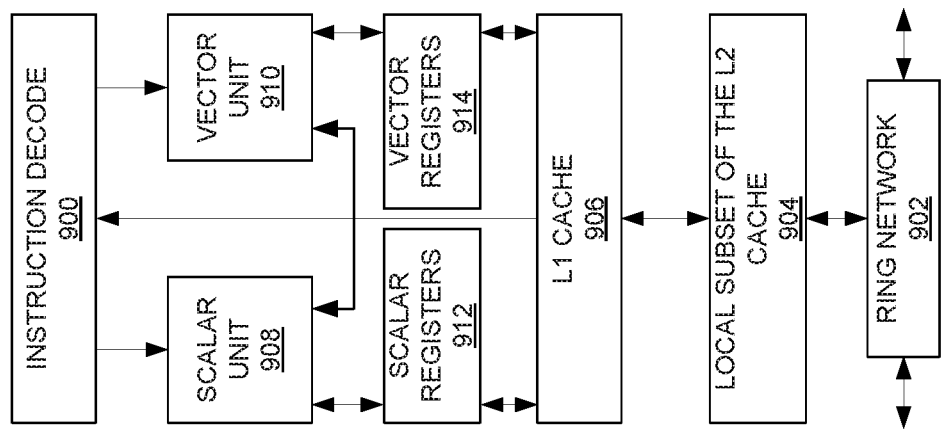

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 10-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input.

Processor with Integrated Memory Controller and Graphics

Figure 10:
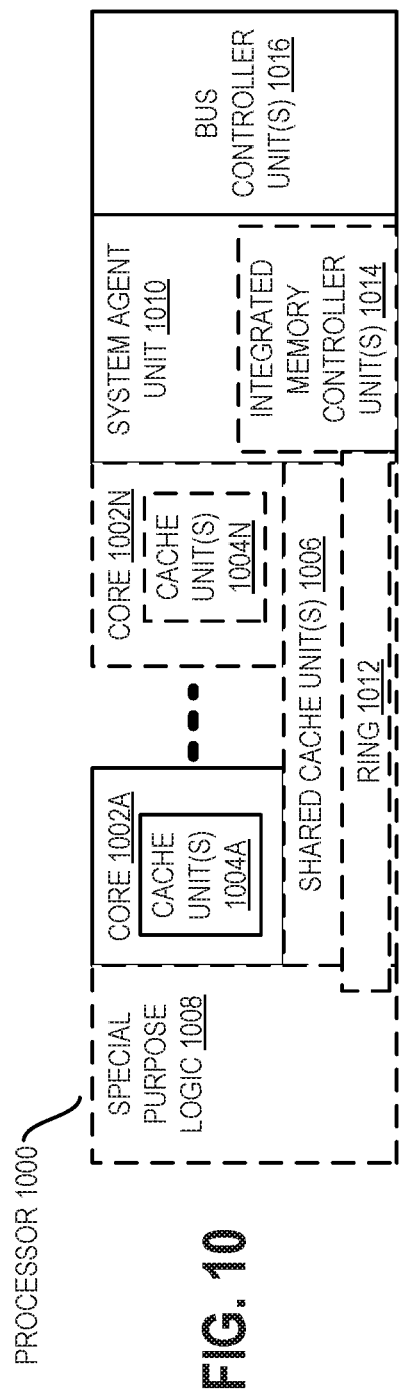
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores 1004A-N, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

Figure 11:
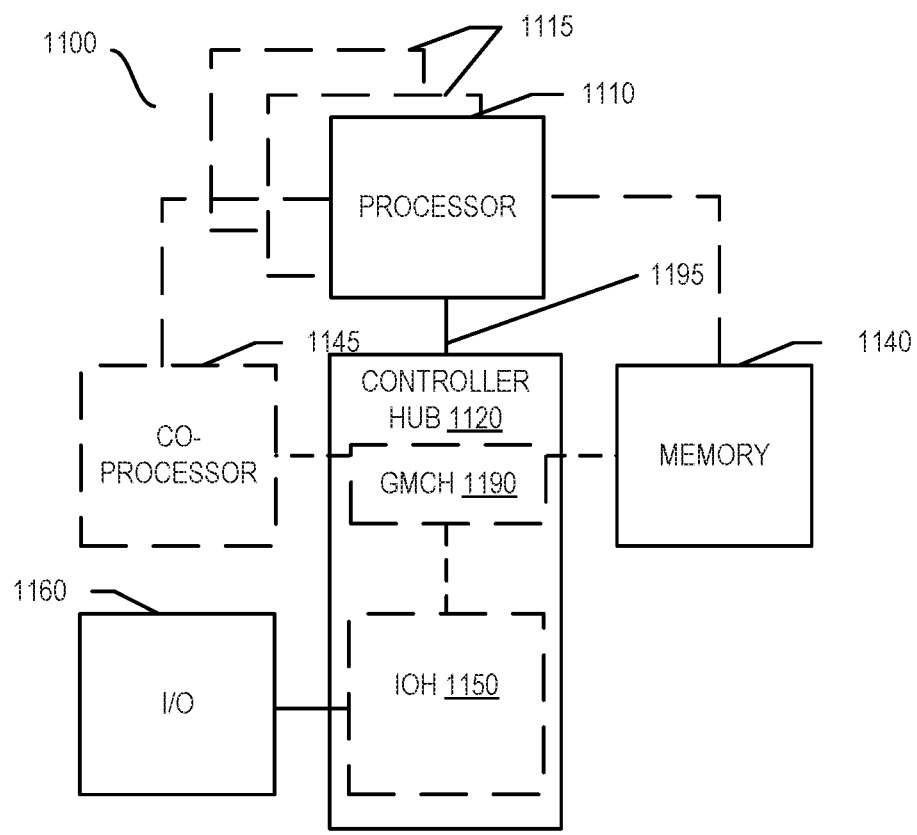
FIGS. 11-14 are block diagrams of exemplary computer architectures.
Figure 12:
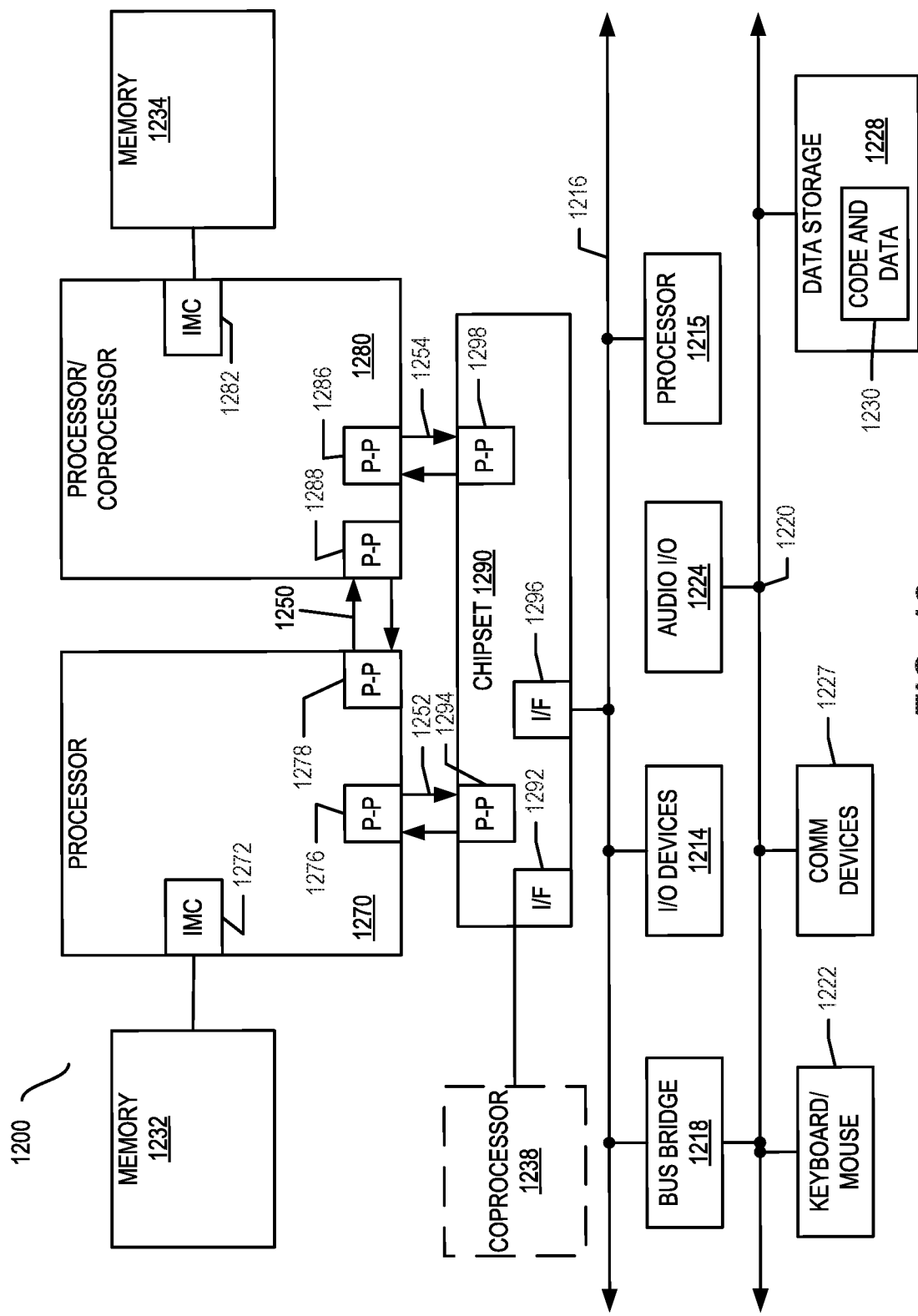

FIGS. 11-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 11, shown is a block diagram of a system 1100 in accordance with one embodiment of the present invention. The system 1100 may include one or more processors 1110, 1115, which are coupled to a controller hub 1120. In one embodiment, the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface, or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 11155 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1292. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1216. Note that other architectures are possible. For example, instead of the point-to-point architecture of FIG. 12, a system may implement a multi-drop bus or other such architecture.

Figure 13:
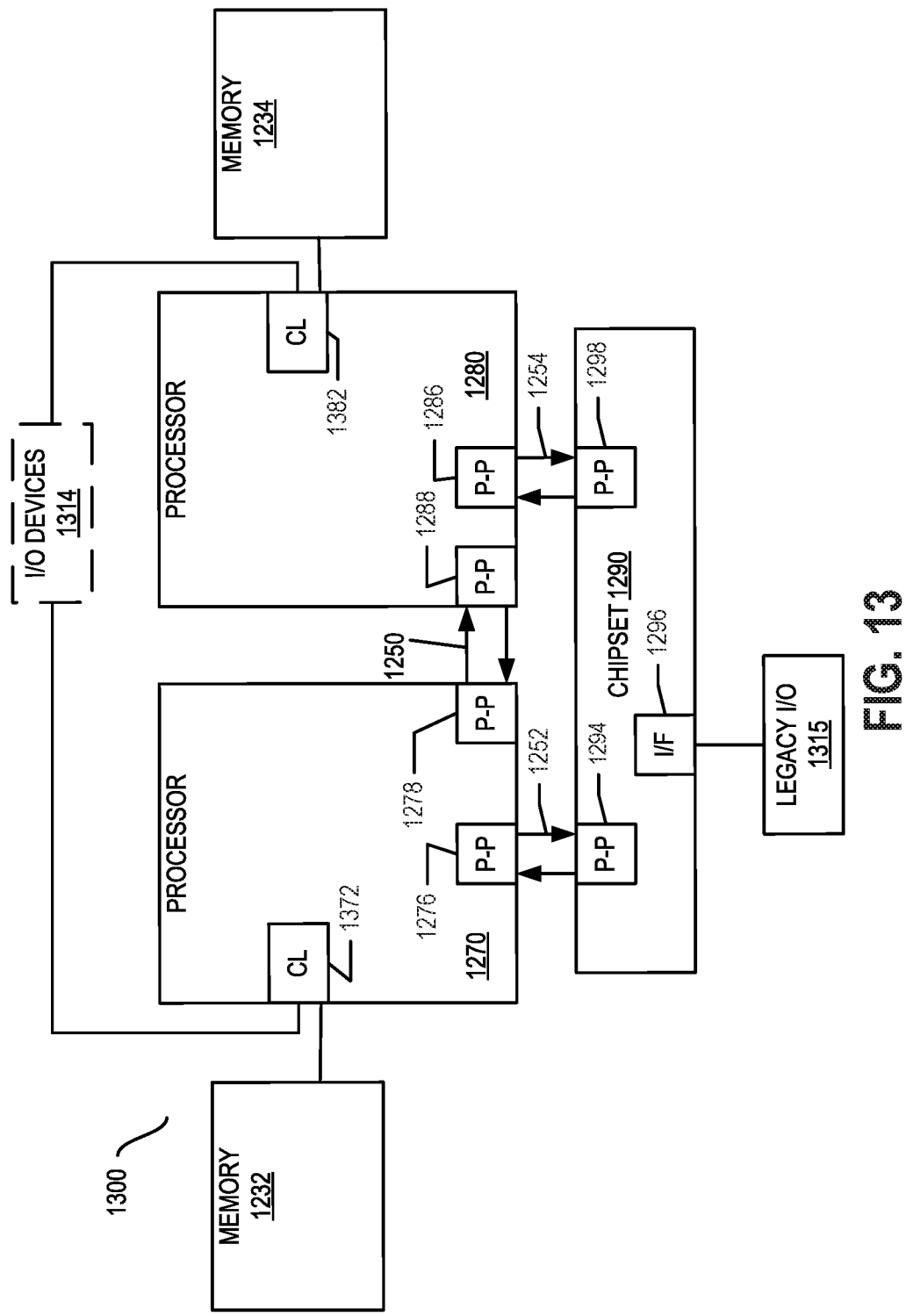

Referring now to FIG. 13, shown is a block diagram of a second more specific exemplary system 1300 in accordance with an embodiment of the present invention Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1372 and 1382, respectively. Thus, the CL 1372, 1382 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
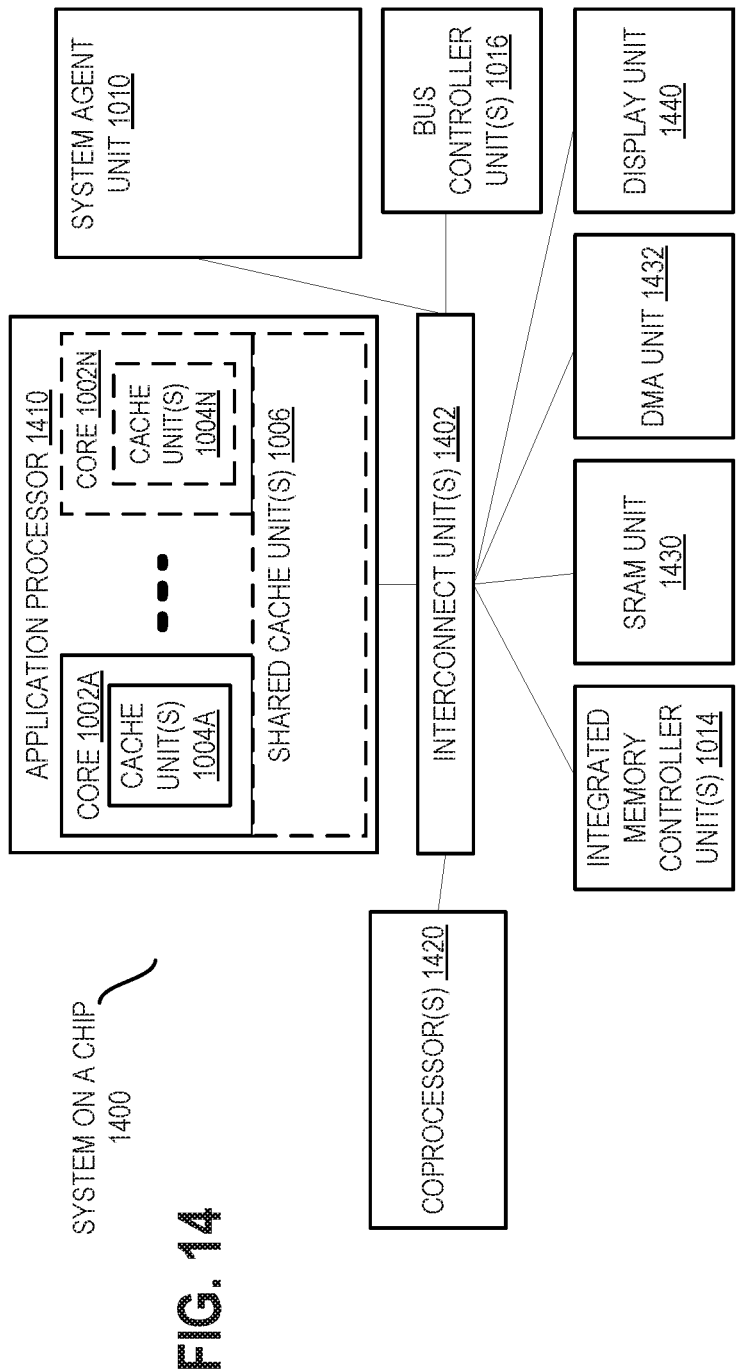

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 1002A-N, cache units 1004A-N, and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an first compiler 1504 to generate a first binary code (e.g., x86) 1506 that may be natively executed by a processor with at least one first instruction set core 1516. In some embodiments, the processor with at least one first instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1504 represents a compiler that is operable to generate binary code of the first instruction set 1506 (e.g., object code) that can, with or without additional linkage processing, be executed on the processor with at least one first instruction set core 1516. Similarly, FIG. 15 shows the program in the high level language 1502 may be compiled using an alternative instruction set compiler 1508 to generate alternative instruction set binary code 1510 that may be natively executed by a processor without at least one first instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the first binary code 1506 into code that may be natively executed by the processor without an first instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter

1512 represents software, firmware, hardware, or a combination thereof that, through emulation, simulation or any other process, allows a processor or other electronic device that does not have a first instruction set processor or core to execute the first binary code 1506.

We claim:

1. An apparatus, comprising:
a processing core;
an input/output (I/O) port, coupled to the processing core, having circuitry to:
establish a first secure communication channel between the processing core and a hardware component that is coupled to the I/O port via a point-to-point interconnect, wherein the first secure communication channel is established using a public key exchange protocol,
maintain a status register indicating a status of the establishment of the first secure communication channel, and
send a cryptographic key to the hardware component using the first secure communication channel, the cryptographic key used to establish a second secure communication channel between the processing core and a device coupled to the hardware component.

2. The apparatus of claim 1, wherein the hardware component is an I/O controller hub supporting one or more I/O devices.

3. The apparatus of claim 1, wherein the hardware component is an I/O controller hub and the device coupled to the hardware component is a secure sensor.

4. The apparatus of claim 1, wherein sending the cryptographic key to the hardware component using the first secure communication channel includes encrypting the cryptographic key using a public key of a public-private key pair created by the public key exchange protocol.

5. The apparatus of claim 1, wherein the I/O port further has circuitry to decrypt data received from the hardware component using a private key of a public-private key pair created using the public key exchange protocol.

6. The apparatus of claim 1, wherein the I/O port further has circuitry to store, in a buffer, data related to at least one operation to be performed subsequent to establishing the first secure communication channel.

7. The apparatus of claim 1, wherein the first secure communication channel between the processing core and the hardware component is established responsive to execution of an instruction requesting establishment of the secure communication channel.

8. The apparatus of claim 1, wherein the I/O port further has circuitry to disable the secure communication channel responsive to execution of an instruction requesting disabling of the secure communication channel.

9. The apparatus of claim 1, wherein the first secure communication channel between the processing core and the hardware component is established responsive to execution of an instruction requesting establishment of the secure communication channel, and wherein ownership of the first secure communication channel is associated with a process identified by the instruction.

10. A processor comprising:
decode circuitry to decode an instruction having an opcode, a first operand identifier, and a second operand identifier, wherein the identified first operand is to store a security request and the identified second operand is to store an ownership identifier; and
execution circuitry to execute the decoded instruction to, responsive to determining that the security request indicates a request to establish a secure communication channel between a processing core and a hardware component that is coupled to an input/output (I/O) port via a point-to-point interconnect, cause first link security circuitry of the processing core and second link security circuitry of the hardware component to establish the secure communication channel using a public key exchange protocol, wherein execution of the decoded instruction further includes maintaining a status register indicating a status of the establishment of the secure communication channel.

11. The processor of claim 10, wherein the identified first operand and identified second operand are registers.

12. The processor of claim 10, wherein the hardware component is an I/O controller hub supporting one or more I/O devices.

13. The processor of claim 10, wherein the hardware component is an I/O controller hub supporting one or more I/O devices including a secure sensor.

14. The processor of claim 10, wherein execution of the decoded instruction further stores, in a buffer, data related to at least one operation to be performed subsequent to establishing the secure communication channel.

15. The processor of claim 10, wherein execution of the decoded instruction further stores the ownership identifier.

16. The processor of claim 10, wherein execution of the decoded instruction further determines whether security of the point-to-point interconnect currently is owned by a process associated with a different ownership identifier from the ownership identifier.

17. A method comprising:
decoding an instruction having an opcode, a first operand identifier, and a second operand identifier, wherein the identified first operand is to store a security request and the identified second operand is to store an ownership identifier; and
executing the decoded instruction to, responsive to determining that the security request indicates a request to establish a secure communication channel between a processing core and a hardware component that is coupled to an input/output (I/O) port via a point-to-point interconnect, causes first link security circuitry of the processing core and second link security circuitry of the hardware component to establish the secure communication channel using a public key exchange protocol, wherein execution of the decoded instruction further includes maintaining a status register indicating a status of the establishment of the secure communication channel.

18. The method of claim 17, wherein the identified first operand and identified second operand are registers.

19. The method of claim 17, wherein the hardware component is an I/O controller hub supporting one or more I/O devices.

20. The method of claim 17, wherein the hardware component is an I/O controller hub and the device coupled to the hardware component is a secure sensor.

21. The method of claim 17, wherein execution of the decoded instruction further includes storing the ownership identifier.

22. The method of claim 17, wherein execution of the decoded instruction further includes determining whether security of the point-to-point interconnect currently is owned by a process associated with a different ownership identifier from the ownership identifier.

23. A non-transitory machine-readable medium storing an instruction which when executed by a processor causes the processor to perform a method, the method comprising:
- decoding an instruction having an opcode, a first operand identifier, and a second operand identifier, wherein the identified first operand is to store a security request and the identified second operand is to store an ownership identifier; and
- executing the decoded instruction to, responsive to determining that the security request indicates a request to establish a secure communication channel between a processing core and a hardware component that is coupled to an input/output (I/O) port via a point-to-point interconnect, causes first link security circuitry of the processing core and second link security circuitry of the hardware component to establish the secure communication channel using a public key exchange protocol, wherein execution of the decoded instruction further includes maintaining a status register indicating a status of the establishment of the secure communication channel.

* * * * *